United States Patent
Davis et al.

(10) Patent No.: US 9,250,655 B2
(45) Date of Patent: Feb. 2, 2016

(54) CHANGING A DISPLAY MODE FOR A GRAPHICAL USER INTERFACE

(75) Inventors: Brian Jeffrey Davis, Raleigh, NC (US); Timothy Clay Doyle, Cary, NC (US); Todd Donald McCormack, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1970 days.

(21) Appl. No.: 11/956,031

(22) Filed: Dec. 13, 2007

(65) Prior Publication Data

US 2009/0153473 A1  Jun. 18, 2009

(51) Int. Cl.
*G09G 3/36* (2006.01)
*G06F 1/16* (2006.01)
*G06F 21/84* (2013.01)

(52) U.S. Cl.
CPC ............ *G06F 1/1637* (2013.01); *G06F 1/1616* (2013.01); *G06F 21/84* (2013.01)

(58) Field of Classification Search
None
See application file for complete search history.

(56) References Cited

U.S. PATENT DOCUMENTS

| | | | |
|---|---|---|---|
| 5,528,319 A | 6/1996 | Austin | |
| 5,825,436 A | 10/1998 | Knight | |
| 6,252,590 B1 * | 6/2001 | Sawai et al. | 345/667 |
| 6,765,550 B2 | 7/2004 | Janick et al. | |
| 7,376,333 B2 * | 5/2008 | Chung et al. | 386/240 |
| 7,711,256 B2 * | 5/2010 | Wun | 396/56 |
| 7,817,106 B2 * | 10/2010 | Fukushima et al. | 345/32 |
| 2001/0033261 A1 * | 10/2001 | Washio et al. | 345/87 |
| 2004/0104882 A1 * | 6/2004 | Kitani et al. | 345/100 |
| 2006/0114246 A1 * | 6/2006 | Young | 345/204 |
| 2007/0188711 A1 | 8/2007 | Sharp et al. | |

FOREIGN PATENT DOCUMENTS

WO   WO 2006030702 A1 *  3/2006

* cited by examiner

*Primary Examiner* — Seokyun Moon
(74) *Attorney, Agent, or Firm* — Yee & Associates, P.C.; James R. Nock (57) ABSTRACT

The illustrative embodiments described herein provide an apparatus and method for changing a display mode. The apparatus includes a graphical user interface having one of a set of display modes. The set of display modes include a passive matrix display mode and an active matrix display mode. The apparatus also includes a switch capable of changing the display mode of the graphical user interface from one display mode to another display mode in the set of display modes.

15 Claims, 4 Drawing Sheets

CHANGING A DISPLAY MODE FOR A GRAPHICAL USER INTERFACE

BACKGROUND OF THE INVENTION

1. Field of the Invention

The present invention relates generally to a method and apparatus for changing a display mode. More particularly, the present invention relates to a method and apparatus for changing a display mode for a graphical user interface.

2. Description of the Related Art

Graphical user interfaces are used in many different applications, including laptops, personal computers, kiosks, personal digital assistants, cell phones, and televisions. A graphical user interface is any device capable of emitting light that is viewable by a user.

Graphical user interface technology has evolved due to a number of factors, including spatial limitations, power consumption, weight, image quality, response time, color gamut, and viewing angle. In this regard, older cathode ray tube graphical user interface technology has given way to liquid crystal display and plasma display panel technologies.

Because the display of some current graphical user interfaces may be viewed from wide viewing angles, the privacy of the user utilizing the graphical user interface may be compromised. A viewing angle is the maximum angle at which a graphical user interface may be displayed without an unacceptable degradation in image quality. For example, when viewed at angles greater than the viewing angle, the image displayed by a graphical user interface may appear poorly saturated, darkened, garbled, faint, blurry, or have poor contrast.

The viewing angle may be measured from one side of the graphical user interface to the opposite. The bisector of the viewing angle may be a line that is perpendicular to the plane defined by the flat surface of the graphical user interface. The viewing angle may also be measured along a horizontal, vertical, or any other axis relative to the graphical user interface.

In determining a viewing angle, the criteria by which an unacceptable degradation in image quality, if measured, may vary. For example, the viewing angle may be determined to be the thresholds at which the luminance of a graphical user interface is one-half of the graphical user interface's maximum luminance. The contrast ratio may also be used to determine the viewing angle. For example, the viewing angle may be determined to be the thresholds at which the contrast ratio of a graphical user interface exceeds 5:1 or 10:1.

Wide viewing angles may compromise the privacy of a user utilizing a graphical user interface by allowing persons other than the user to view the graphical user interface. For example, strangers may be able to see the personal data related to a user who is using a laptop in a public setting. In another example, secure information may be compromised if unauthorized persons are allowed to view, from a large viewing angle, data emitted from a graphical user interface.

One current device for increasing the privacy of a user utilizing a graphical user interface having a wide viewing angle is a screen that is placed in front on the graphical user interface. For example, this screen may be placed in front of a laptop monitor. However, although such screen are designed to block viewing outside of a predetermined viewing angle, such screen also cause an unacceptable degradation in image quality inside of the viewing angle as well. For example, the brightness of the image inside of the viewing angle may be severely compromised.

Also, the currently used screens must be inconveniently transported and kept near the graphical user interface. These screens may also become blurry or scratched over time. Hence, frequent replacement of such screens may be necessary.

BRIEF SUMMARY OF THE INVENTION

The illustrative embodiments described herein provide an apparatus and method for changing a display mode. The apparatus includes a graphical user interface having one of a set of display modes. The set of display modes include a passive matrix display mode and an active matrix display mode. The apparatus also includes a switch capable of changing the display mode of the graphical user interface from one display mode to another display mode in the set of display modes.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
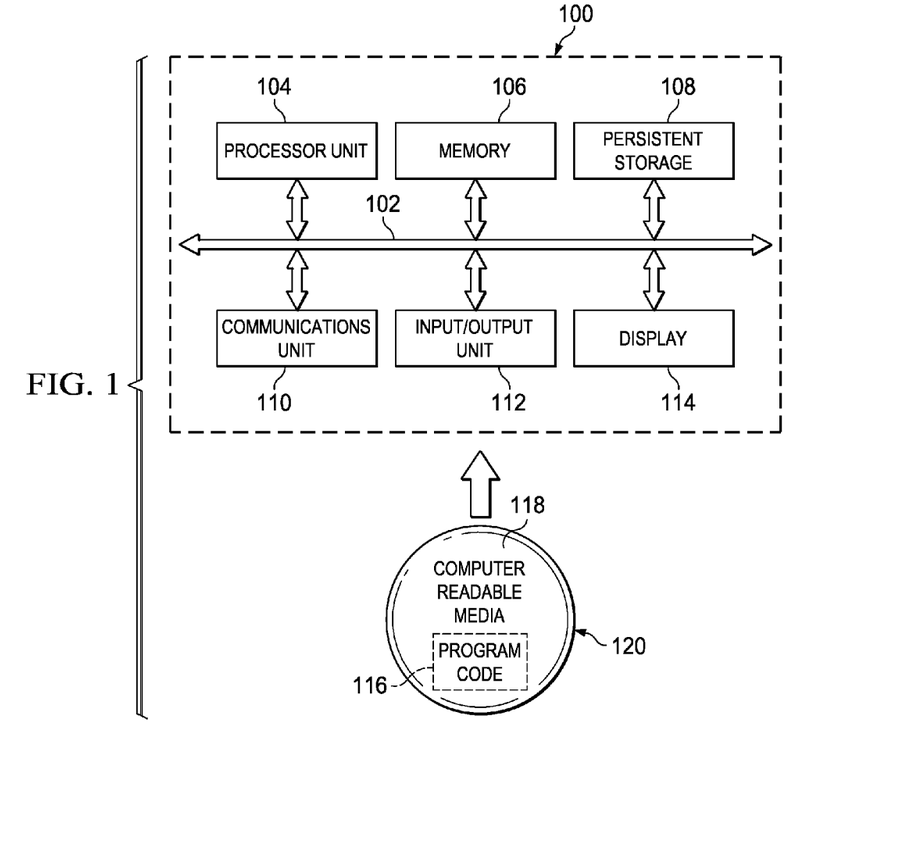
FIG. 1 is a diagram of a data processing system in accordance with an illustrative embodiment of the present invention.

Turning now to FIG. 1, a diagram of a data processing system is depicted in accordance with an illustrative embodiment of the present invention. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer.

Display 114 provides a mechanism to display information to a user. Display 114 is a graphical user interface capable of having both a passive matrix display mode and an active matrix display mode. In one embodiment, display 114 is a liquid crystal display graphical user interface having a grid of pixels capable of emitting light having varying colors. A passive matrix display mode is a display mode in which each pixel maintains its state without additional circuitry, such as a transistor, being electrically coupled to each individual pixel. An active matrix display mode is a display mode in which each pixel's state is maintained using additional circuitry, such as a transistor, that is electrically coupled to each pixel.

Instructions for the operating system and applications or programs are located on persistent storage 108. These instructions may be loaded into memory 106 for execution by processor unit 104. The processes of the different embodiments may be performed by processor unit 104 using computer-implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to data processing system 100 for execution by processor unit 104. Program code 116 and computer readable media 118 form computer program product 120 in these examples. Program code 116 may include computer readable instructions for switching the display mode of display 114, such as switching the display mode between a passive matrix display mode and an active matrix display mode.

In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to data processing system 100. The tangible form of computer readable media 118 is also referred to as computer recordable storage media. In some instances, computer readable media 118 may not be removable.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown.

As one example, a storage device in data processing system 100 is any hardware apparatus that may store data. Memory 106, persistent storage 108 and computer readable media 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

The illustrative embodiments described herein provide an apparatus and method for changing a display mode. The apparatus includes a graphical user interface having one of a set of display modes. In one embodiment, the graphical user interface is a liquid crystal display monitor, which is sometimes referred to as an "LCD" monitor.

The set of display modes includes a passive matrix display mode and an active matrix display mode. A passive matrix display mode is a display mode in which each pixel maintains its state without additional circuitry, such as a transistor, being electrically coupled to each individual pixel. An active matrix display mode is a display mode in which each pixel's state is maintained using additional circuitry, such as a transistor, that is electrically coupled to each pixel. Additional display modes may also be included in the set of display modes.

The apparatus also includes a switch capable of changing the display mode of the graphical user interface from one display mode to another display mode in the set of display modes. For example, the switch may change the display mode of the graphical user interface from the passive matrix display mode to the active matrix display mode. In another example, the switch may change the display mode of the graphical user interface from the active matrix display mode to the passive matrix display mode.

In another embodiment, the graphical user interface comprises a plurality of pixels. A pixel, which is short for picture element, is a light-emitting device in the graphical user interface. In this embodiment, each pixel in the plurality of pixels is coupled to a respective transistor in a plurality of transistors, such as a plurality of thin film transistors. A thin film transistor is a type of field effect transistor made by the deposition of thin films. In one example, each of the plurality of transistors is sequentially switched on and off in the active matrix display mode. Conversely, each of the plurality of transistors is switched on continually in the passive matrix display mode. In other words, there is no sequential switching of the transistors in the passive matrix display mode.

In one example, the switch may be a button. In this example, the button may be included on a data processing system that uses the graphical user interface. In this example, the data processing system may also include a keyboard on which the button is located.

In another embodiment, the button may be displayed on the graphical user interface. For example, the button may be an icon or text on the displayed desktop or toolbar. In this embodiment, the button may also be selectable using a pointing device, such as a mouse.

Figure 2:
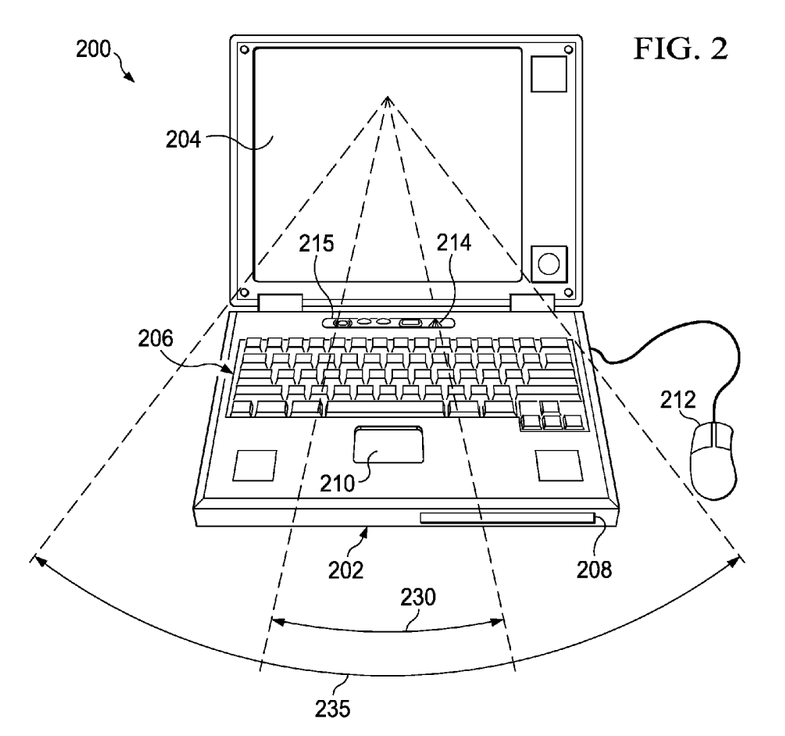
FIG. 2 is an illustration of a computing device in accordance with an illustrative embodiment.

Turning now to FIG. 2, an illustration of a computing device is depicted in accordance with an illustrative embodiment. Specifically, FIG. 2 shows mobile computer 200, which is a non-limiting example of data processing system 100 in FIG. 1. In other illustrative embodiments, mobile computer 200 may also be a desktop computer, kiosk, personal digital assistant, or other data processing system having a graphical user interface.

Mobile computer 200 includes system unit exterior 202, graphical user interface 204, keyboard 206, storage devices 208, which may include floppy drives and other types of permanent and removable storage media, and pointing device 210. In one example, graphical user interface 204 is a liquid crystal display monitor.

Additional input devices may be included with mobile computer 200, such as, for example, pointing device 212. Although pointing device 212 is depicted as a mouse, pointing device 212 may be any device capable of changing the display of graphical user interface 204 in some way. For example, pointing device 212 may be a joystick, touch screen, trackball, and the like. Mobile computer 200 may be implemented using any suitable computer, such as an IBM Thinkpad computer, which is a product of International Business Machines Corporation, located in Armonk, N.Y. In one embodiment, graphical user interface 204 may be implemented by means of systems software residing in computer readable media in operation within mobile computer 200.

In one illustrative embodiment, graphical user interface 204 may have any one of a set of display modes. These display modes may include a passive matrix display mode and an active matrix display mode. Additional details regarding the passive matrix and active matrix display modes, as well as the components included in graphical user interface 204, will be discussed in greater detail in FIG. 3 below.

In one embodiment, mobile computer 200 also includes a switch that changes the display mode of graphical user interface 204 from one display mode to another display mode in the set of display modes. For example, the switch may change the display mode of graphical user interface 204 from the passive matrix display mode to the active matrix display mode. In another example, the switch may change the display mode of graphical user interface 204 from the active matrix display mode to the passive matrix display mode.

The switch may be implemented in the illustrative embodiments in various ways. In one embodiment, the switch is a button, such as toggle button, pushable button, or slidable button. In another example, the button is a key included in keyboard 206. However, the button may be located anywhere on mobile computer 200.

The switch may also be a voice-activated switch. In this example, the voice-activated switch may include a microphone that detects audio input.

In another example, the button is displayed on graphical user interface 204. In the example, the button may be displayed as an icon, text, or other image on graphical user interface 204. The displayed button may be a toggle button, slidable button, menu selection, or any other button type with which a selection may be made. Also, the displayed button may appear on a toolbar, graphical desktop, or as part of another application.

In this example, the displayed button may be selectable by keyboard 206 or pointing devices 210 and 212. For example, the displayed button may be selected by moving a pointer over the button using keyboard 206 or pointing devices 210 and 212. The button may then be selected by pressing a key on either keyboard 206 or a button on pointing devices 210 and 212.

Graphical user interface 204 may also signal the current display mode to the user. For example, graphical user interface 204 may present an image indicating that the current display mode is either the active matrix display mode or the passive matrix display mode. The image may be text, an icon, or a combination thereof. For example, upon a user utilizing the switch to change display modes, graphical user interface 204 may display the words "active matrix" or "passive matrix." Alternatively, graphical user interface 204 may display the words "privacy disabled" for active matrix display mode and "privacy enabled" for passive matrix display mode.

Set of system indicators 215, which may be illuminable icons on the exterior of mobile computer 200, may also signal the current display mode to the user. For example, system icon 214 may illuminate or change colors when graphical user interface 204 is in the active matrix display mode.

Using the switch, the display mode of graphical user interface 204 may be changed between passive matrix display mode and active matrix display mode. As will be explained in further detail in FIG. 3 below, the passive matrix display mode may have a narrower viewing angle than the active matrix display mode.

Thus, while in passive matrix display mode, the images displayed by graphical user interface 204 are not unacceptably degraded when viewed within viewing angle 230. On the other hand, while in active matrix display mode, the images displayed by graphical user interface 204 are not unacceptably degraded when viewed within larger viewing angle 235.

Because a user may change between passive matrix display mode and active matrix display mode using a switch, as implemented in the various illustrative embodiments described above, a user may control the viewing angle at which images on graphical user interface 204 may be viewed. Therefore, the user may control the degree of privacy the user has with respect to the images displayed on graphical user interface 204.

In another embodiment, hybrid display modes may also be selected by the switch. In the example in which the switch is slidable button, a hybrid display mode that has a viewing angle between viewing angles 230 and 235 may be selected. This viewing angle may be varied by sliding the slidable button. In this hybrid display mode, graphical user interface 204 displays characteristics of both the passive matrix display mode and the active matrix display mode.

Figure 3:
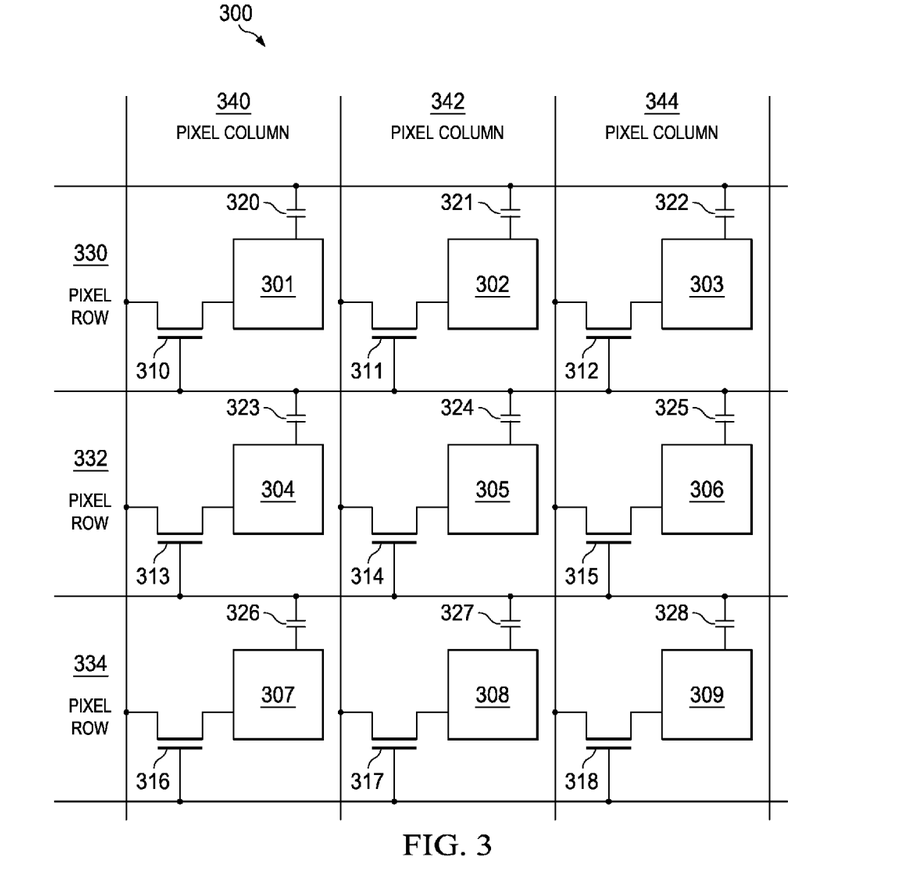
FIG. 3 is an illustration of a displaying device in accordance with an illustrative embodiment.

Turning now to FIG. 3, an illustration of a displaying device is depicted in accordance with an illustrative embodiment. Specifically, FIG. 3 shows graphical user interface 300, which is a non-limiting example of a portion of graphical user interface 204 in FIG. 2. FIG. 3 shows components that are contained in graphical user interface 300. Graphical user interface 300 is an example of a liquid crystal display monitor.

Graphical user interface 300 contains pixels 301, 302, 303, 304, 305, 306, 307, 308, and 309. Pixels 301, 302, 303, 304, 305, 306, 307, 308, and 309, as well as any other pixels in graphical user interface 300, are capable of emitting light of different colors to form a visible image. Pixels 301, 302, 303, 304, 305, 306, 307, 308, and 309 may also be bi-stable pixels.

Each of pixels 301, 302, 303, 304, 305, 306, 307, 308, and 309 is coupled to one of transistors 310, 311, 312, 313, 314, 315, 316, 317, and 318, respectively. Transistors 310, 311, 312, 313, 314, 315, 316, 317, and 318 may be thin film transistors. Similarly, each of pixels 301, 302, 303, 304, 305, 306, 307, 308, and 309 is coupled to one of capacitors 320, 321, 322, 323, 324, 325, 326, 327, and 328, respectively.

In passive matrix display mode, the switching of transistors 310, 311, 312, 313, 314, 315, 316, 317, and 318 is deactivated. For example, a constant gate voltage is supplied to transistors 310, 311, 312, 313, 314, 315, 316, 317, and 318. As a result, transistors 310, 311, 312, 313, 314, 315, 316, 317, and 318 are in a constant conductive state with switching of the transistors disabled. Thus, because transistors 310, 311, 312, 313, 314, 315, 316, 317, and 318 are in a constant conductive state, each of pixels 301, 302, 303, 304, 305, 306, 307, 308, and 309 are connected directly and constantly to the column conductors, creating a passive matrix condition, without using transistors 310, 311, 312, 313, 314, 315, 316, 317, and 318, respectively, to address the individual pixels.

Pixels in a passive matrix display mode are addressed using a conductive grid having electrodes across each row and column. With respect to graphical user interface 300, pixels 301, 302, 303, 304, 305, 306, 307, 308, and 309 are addressed by applying voltages across pixel rows 330, 332, and 334 and pixel columns 340, 342, and 344. For example, a selected voltage may be applied across pixel row 332 and pixel column 344 such that pixel 306 is illuminated.

The voltages may be applied across pixel rows 330, 332, and 334 and pixel columns 340, 342, and 344 using separate electrodes, which span across each of pixel rows 330, 332, and 334 and pixel columns 340, 342, and 344. In the example above, pixel 306 may be illuminated by applying a particular voltage across the electrodes spanning pixel row 332 and pixel column 344.

When one of pixels 301, 302, 303, 304, 305, 306, 307, 308, and 309 is addressed in this manner, the pixel has a particular electrical state. In the passive matrix display mode, each pixel must maintain this state without the aid of transistors 310, 311, 312, 313, 314, 315, 316, 317, and 318. This state may need to be maintained until each pixel is refreshed. While in passive matrix display mode, graphical user interface 300 may have a narrower viewing angle, such as viewing angle 230 in FIG. 2.

Graphical user interface 300 may also be in the active matrix display mode. In active matrix display mode, transistors 310, 311, 312, 313, 314, 315, 316, 317, and 318 are activated by supplying voltage to transistors 310, 311, 312, 313, 314, 315, 316, 317, and 318. As a result, transistors 310, 311, 312, 313, 314, 315, 316, 317, and 318 are turned on.

Transistors 310, 311, 312, 313, 314, 315, 316, 317, and 318 act as switches that allow only the addressed pixel to receive a charge originating from the electrodes across pixel rows 330, 332, and 334 and pixel columns 340, 342, and 344. Capacitors 320, 321, 322, 323, 324, 325, 326, 327, and 328 may then hold the charge at each respective pixel until the pixel may be refreshed again.

While in active matrix display mode, graphical user interface 300 may have a wider viewing angle, such as viewing angle 235 in FIG. 2. Thus, by using the switch described in FIG. 2, a user may switch between passive matrix and active matrix display modes to vary the viewing angle of graphical user interface 300.

Figure 4:
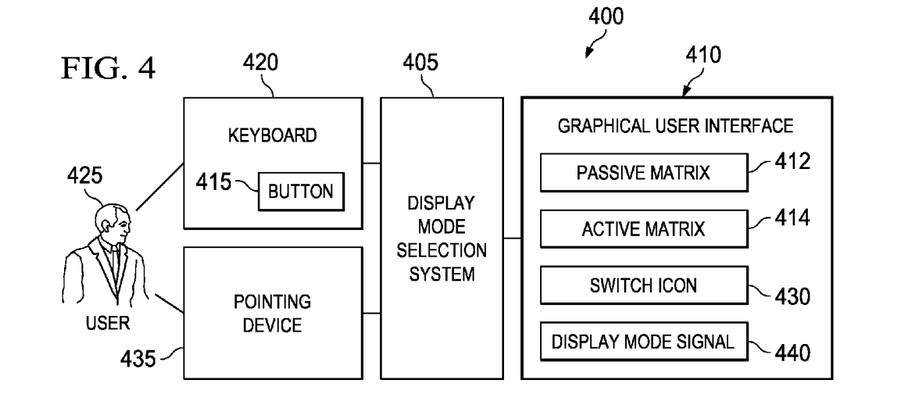
FIG. 4 is a block diagram of a system for changing a display mode in accordance with an illustrative embodiment.

Turning now to FIG. 4, a block diagram of a system for changing a display mode is depicted in accordance with an illustrative embodiment. Specifically, FIG. 4 contains data processing system 400, which is a non-limiting example of data processing system 100 in FIG. 1.

Data processing system 400 contains display mode selection system 405. Display mode selection system 405 receives a user selection of a display mode for graphical user interface 410, which is a hardware device or component in these examples. Examples of graphical user interface 410 include display 114 in FIG. 1, graphical user interface 204 in FIG. 2, graphical user interface 300 in FIG. 3, any monitor connected to a data processing system, a television, kiosk, personal digital assistant, or any other display capable of emitting light.

Graphical user interface 410 includes the components necessary to have both passive matrix 412 and active matrix 414. A non-limiting example of a graphical user interface having both a passive matrix and active matrix is graphical user interface 300 in FIG. 3.

In the example of the monitor connected to a data processing system, the connection may by direct, indirect, or over a network. Although display mode selection system 405 to shown to be connected to a single graphical user interface 410, display mode selection system 405 may be connected to multiple graphical user interfaces for which user selections of display modes may be received.

The user selection of the display mode may be received from a switch. In one embodiment, the switch is a button located on data processing system 400. For example, the switch may be button 415, which is located on keyboard 420. Keyboard 206 in FIG. 2 is a non-limiting example of keyboard 420.

The user selection of the display mode may also be received from graphical user interface 410. In this example, user 425 may select switch icon 430, which is displayed on graphical user interface 410, using pointing device 435. Pointing devices 210 and 212 in FIG. 2 are non-limiting examples of pointing device 435. Non-limiting examples of a switch icon, such as a button, that may be displayed on a graphical user interface has been given in FIG. 2 above.

The display modes that may be selected by user 425 via the switch includes a passive matrix display mode, which uses passive matrix 412, and an active matrix display mode, which uses active matrix 414. Responsive to receiving the user selection from the switch, which may be implemented as any of the illustrative embodiment described above, display mode selection system 405 changes the display mode of graphical user interface 410 based on the user selection.

In one embodiment, changing the display mode of graphical user interface 410 based on the user selection includes changing the display mode of graphical user interface 410 from the passive matrix display mode to the active matrix display mode. In this embodiment, each of the transistors, such as transistors 310, 311, 312, 313, 314, 315, 316, 317, and 318 in FIG. 3, which are coupled to the pixels in graphical user interface 410, are activated.

In one embodiment, changing the display mode of graphical user interface 410 based on the user selection includes changing the display mode of graphical user interface 410 from the active matrix display mode to the passive matrix display mode. In this embodiment, each of the transistors, such as transistors 310, 311, 312, 313, 314, 315, 316, 317, and 318 in FIG. 3, which are coupled to the pixels in graphical user interface 410, are deactivated.

Graphical user interface 410 includes display mode signal 440. Display mode signal 440 signals the current display mode to user 425. Non-limiting examples of such a display mode signal have been described in FIG. 2 above.

Figure 5:
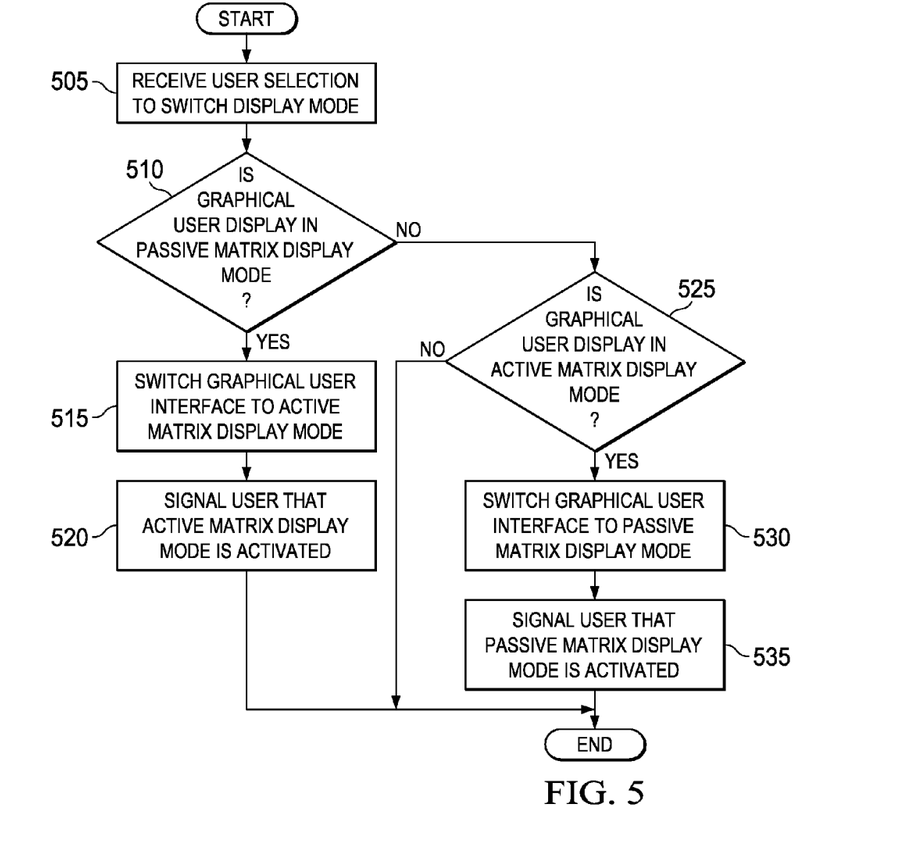
FIG. 5 is a flowchart illustrating a process for changing a display mode in accordance with an illustrative embodiment.

Turning now to FIG. 5, a flowchart illustrating a process for changing a display mode is depicted in accordance with an illustrative embodiment. The process illustrated in FIG. 5 may be implemented by a display mode selection system, such display mode selection system 405 in FIG. 4.

The process begins by receiving a user selection to switch the display mode of a graphical user interface (step 505). In one example, the user selection is made via a toggle switch. The process then determines whether the graphical user interface is in a passive matrix display mode (step 510).

If the process determines that the graphical user interface is in a passive matrix display mode, the process switches the graphical user interface to an active matrix display mode (step 515). The process then signals the user that the active matrix display mode is activated (step 520). For example, the graphical user interface may display text indicating that privacy is disabled.

Returning to step 510, if the process determines that the graphical user interface is not in a passive matrix display mode, the process determines whether the graphical user interface is in the active matrix display mode (step 525). If the process determines that the graphical user interface is in the active matrix display mode, the process switches the graphical user interface to passive matrix display mode (step 530). The process then signals the user that the passive matrix display mode is activated (step 535). For example, the graphical user interface may display text indicating that privacy is enabled. The process then terminates. Returning to step 525, if the process determines that the graphical user interface is not in the active matrix display mode, the process terminates.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The illustrative embodiments described herein provide an apparatus and method for changing a display mode. The apparatus includes a graphical user interface having one of a set of display modes. In one embodiment, the graphical user interface is a liquid crystal display monitor.

The set of display modes includes a passive matrix display mode and an active matrix display mode. Additional display modes may also be included in the set of display modes.

The apparatus also includes a switch capable of changing the display mode of the graphical user interface from one display mode to another display mode in the set of display modes. For example, the switch may change the display mode of the graphical user interface from the passive matrix display mode to the active matrix display mode. In another example, the switch may change the display mode of the graphical user interface from the active matrix display mode to the passive matrix display mode.

In another embodiment, the graphical user interface comprises a plurality of pixels in this embodiment; each pixel in the plurality of pixels is coupled to a respective transistor in a plurality of transistors, such as a plurality of thin film transistors. In one example, each of the plurality of transistors is sequentially switched on and off in the active matrix display mode. Conversely, each of the plurality of transistors is switched on continually in the passive matrix display mode.

In one example, the switch may be a button. In this example, the button may be included on a data processing system that uses the graphical user interface. In this example, the data processing system may also include a keyboard on which the button is located.

In another embodiment, the button may be displayed on the graphical user interface. For example, the button may be an icon or text on the displayed desktop or toolbar. In this embodiment, the button may also be selectable using a pointing device, such as a mouse.

The illustrative embodiment described above allow a user to switch a graphical user interface, such as a computer monitor, between active matrix and passive matrix display modes depending on the degree of privacy desired by the user. Changing between active matrix and passive matrix display modes may be performed via an on-demand privacy switch that is selectable by the user. The user may also be apprised of the current display mode via a signal emitted from a data processing system or the graphical user interface itself.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus for changing a display mode, comprising:
   a graphical user interface comprising a plurality of pixels, wherein each pixel in the plurality of pixels is coupled to a respective transistor in a plurality of transistors and wherein each pixel in the plurality of pixels is connected to a grid having a plurality of electrodes, the graphical user interface having a set of display modes that includes a passive matrix display mode and an active matrix display mode; and
   a slidable switch configured to receive a selection from a user varying a user-defined ratio between a first portion of transistors in the plurality of transistors associated with the active matrix display mode and a second portion of transistors in the plurality of transistors associated with the passive matrix display mode based on a user-defined position of the slidable switch, wherein the first portion of transistors associated with the active matrix display mode is activated to sequentially switch on and off and the second portion of transistors associated with the passive matrix display mode is supplied with a constant gate voltage, and wherein in varying the user-defined ratio between the first portion of transistors associated with the active matrix display mode and the second portion of transistors associated with the passive matrix display mode based on the user-defined position of the slidable switch, the slidable switch deactivates sequential switching on and off of one or more of the first portion of transistors associated with the active matrix display mode by supplying the constant gate voltage to the one or more of the first portion of transistors associated with the active matrix display mode which deactivates the sequential switching on and off of the one or more of the first portion of transistors associated with the active matrix display mode in response to the user-defined position of the slidable switch decreasing an amount of transistors associated with the active matrix display mode.

2. The apparatus of claim 1, wherein in the passive matrix display mode the plurality of pixels are addressed using the grid having the plurality of electrodes and the each pixel maintains a state of the each pixel without the sequential switching on and off of the respective transistor.

3. The apparatus of claim 1, wherein the graphical user interface is a liquid crystal display monitor.

4. The apparatus of claim 1, wherein in varying the user-defined ratio between the first portion of transistors associated with the active matrix display mode and the second portion of transistors associated with the passive matrix display mode based on the user-defined position of the slidable switch, the slidable switch activates the sequential switching on and off of one or more of the second portion of transistors associated with the passive matrix display mode in response to the user-defined position of the slidable switch decreasing an amount of transistors associated with the passive matrix display mode.

5. The apparatus of claim 1, wherein the plurality of transistors is a plurality of thin film transistors.

6. The apparatus of claim 1, wherein the slidable switch is a slidable button.

7. The apparatus of claim 6, further comprising:
   a data processing system, wherein the data processing system comprises the slidable button.

8. The apparatus of claim 7, wherein the data processing system comprises a keyboard, and wherein the slidable button is located on the keyboard.

9. The apparatus of claim 6, wherein the slidable button is a slidable button icon displayed on the graphical user interface, and wherein the slidable button icon is selectable using a pointing device.

10. The apparatus of claim 1, wherein the slidable switch is a voice activated switch.

11. The apparatus of claim 4, wherein the graphical user interface displays an icon indicating the user-defined ratio between the amount of transistors associated with the active matrix display mode and the amount of transistors in the amount of transistors associated with the passive matrix display mode.

12. A computer-implemented method for changing a display mode, comprising:
   receiving, by a data processing system from a slidable switch, a selection from a user varying a user-defined ratio between a first portion of transistors in a plurality of transistors associated with an active matrix display mode and a second portion of transistors in the plurality of transistors associated with a passive matrix display mode of a graphical user interface comprising a plurality of pixels, wherein each pixel in the plurality of pixels is coupled to a respective transistor in the plurality of transistors, and wherein each pixel in the plurality of pixels is connected to a grid having a plurality of electrodes; and
   responsive to the data processing system receiving the selection from the user varying the user-defined ratio between the first portion of transistors in the plurality of transistors associated with an active matrix display mode and the second portion of transistors in the plurality of transistors associated with a passive matrix display mode from the slidable switch, varying, by the data processing system, the user-defined ratio between the first portion of transistors in the plurality of transistors associated with an active matrix display mode and the second portion of transistors in the plurality of transistors associated with a passive matrix display mode based on a user-defined position of the slidable switch, wherein the first portion of transistors associated with an active matrix display mode is activated to sequentially switch on and off and the second portion of transistors associated with a passive matrix display mode is supplied with a constant gate voltage, and wherein in varying the user-defined ratio between the first portion of transistors associated with the active matrix display mode and the second portion of transistors associated with the passive matrix display mode based on the user-defined position of the slidable switch, the slidable switch deactivates sequential switching on and off of one or more of the first portion of transistors associated with the active matrix display mode by supplying the constant gate voltage to the one or more of the first portion of transistors associated with the active matrix display mode which deactivates the sequential switching on and off of the one or more of the first portion of transistors associated with the active matrix display mode in response to the user-defined position of the slidable switch decreasing an amount of transistors associated with the active matrix display mode.

13. The computer-implemented method of claim 12, wherein varying the user-defined ratio between the first portion of transistors associated with the active matrix display mode and the second portion of transistors associated with the passive matrix display mode based on the user-defined position of the slidable switch comprises:

varying the user-defined ratio between the first portion of transistors associated with the active matrix display mode and the second portion of transistors associated with the passive matrix display mode by activating the sequential switching on and off of one or more of the second portion of transistors associated with the passive matrix display mode in response to the user-defined position of the slidable switch decreasing an amount of transistors associated with the passive matrix display mode.

14. The computer-implemented method of claim 12, further comprising:

addressing the plurality of pixels in the passive matrix display mode using the grid having the plurality of electrodes, wherein the each pixel maintains a state of the each pixel without the sequential switching on and off of the respective transistor.

15. A computer program product stored on a non-transitory computer-readable storage device having computer-usable program code embodied thereon that is executable by a computer for changing a display mode, the computer program product comprising:

computer-usable program code for receiving, from a slidable switch, a selection from a user varying a user-defined ratio between a first portion of transistors in a plurality of transistors associated with an active matrix display mode and a second portion of transistors in the plurality of transistors associated with a passive matrix display mode of a graphical user interface comprising a plurality of pixels, wherein each pixel in the plurality of pixels is coupled to a respective transistor in the plurality of transistors, and wherein each pixel in the plurality of pixels is connected to a grid having a plurality of electrodes; and computer-usable program code, responsive to receiving the selection from the user varying the user-defined ratio between the first portion of transistors in the plurality of transistors associated with an active matrix display mode and the second portion of transistors in the plurality of transistors associated with a passive matrix display mode from the slidable switch, for varying the user-defined ratio between the first portion of transistors in the plurality of transistors associated with an active matrix display mode and the second portion of transistors in the plurality of transistors associated with a passive matrix display mode based on a user-defined position of the slidable switch, wherein the first portion of transistors associated with an active matrix display mode is activated to sequentially switch on and off and the second portion of transistors associated with a passive matrix display mode is supplied with a constant gate voltage, and wherein in varying the user-defined ratio between the first portion of transistors associated with the active matrix display mode and the second portion of transistors associated with the passive matrix display mode based on the user-defined position of the slidable switch, the slidable switch deactivates sequential switching on and off of one or more of the first portion of transistors associated with the active matrix display mode by supplying the constant gate voltage to the one or more of the first portion of transistors associated with the active matrix display mode which deactivates the sequential switching on and off of the one or more of the first portion of transistors associated with the active matrix display mode in response to the user-defined position of the slidable switch decreasing an amount of transistors associated with the active matrix display mode.

* * * * *